US008802985B2

(12) United States Patent
Lettkeman (10) Patent No.: US 8,802,985 B2
(45) Date of Patent: Aug. 12, 2014

(54) IN-WALL EXTENSION APPARATUS (75) Inventor: David M. Lettkeman, Parker, CO (US)

(73) Assignee: Dish Network L.L.C., Englewood, CO (US)

( * ) Notice: Subject to any disclaimer, the term of this patent is extended or adjusted under 35 U.S.C. 154(b) by 150 days.

(21) Appl. No.: 13/226,929

(22) Filed: Sep. 7, 2011

(65) Prior Publication Data

US 2013/0056259 A1    Mar. 7, 2013

(51) Int. Cl.
H02G 3/14    (2006.01)
H05K 5/03    (2006.01)

(52) U.S. Cl.
USPC ............................................. 174/66; 174/67

(58) Field of Classification Search
None
See application file for complete search history.

(56) References Cited

U.S. PATENT DOCUMENTS

| | | |
|---|---|---|
| 1,994,998 A | 3/1935 | Hull |
| 3,347,505 A | 10/1967 | Menser |
| 3,728,796 A | 4/1973 | Lobaugh |
| 4,174,821 A | 11/1979 | Levine |
| 4,203,639 A | 5/1980 | Mohr et al. |
| 4,358,096 A | 11/1982 | Paton et al. |
| 4,361,375 A * | 11/1982 | Bailey et al. ............... 439/357 |
| 4,500,064 A | 2/1985 | Calabro |
| 4,535,689 A | 8/1985 | Putkowski |
| 4,546,549 A | 10/1985 | Duperon |
| 4,589,213 A | 5/1986 | Woodward |
| 4,598,297 A | 7/1986 | Hawkins |
| 4,698,640 A | 10/1987 | Redman |
| 4,850,114 A | 7/1989 | Vockins |
| 4,858,865 A | 8/1989 | Schrepfer |
| 4,888,875 A | 12/1989 | Strother |
| 4,908,949 A | 3/1990 | Jaccard |
| 4,934,706 A | 6/1990 | Marshall |
| 5,063,679 A | 11/1991 | Schwandt |
| 5,149,277 A | 9/1992 | LeMaster |
| 5,154,000 A | 10/1992 | Mahoney et al. |
| 5,167,075 A | 12/1992 | Weldy et al. |
| 5,306,165 A | 4/1994 | Nadeau |
| 5,359,820 A * | 11/1994 | McKay ............................ 52/34 |
| 5,574,256 A * | 11/1996 | Cottone ......................... 174/53 |

(Continued)

FOREIGN PATENT DOCUMENTS

| | | |
|---|---|---|
| JP | 2000-049516 A | 2/2000 |
| JP | 2002-374108 A | 12/2002 |
| KR | 2000-0047707 A | 7/2000 |

OTHER PUBLICATIONS

Midlite Corporation, The Power Jumper, HDTV Power Relocation Kit, Nov. 10, 2011, www.midlite.com.

(Continued)

*Primary Examiner* — Hoa C Nguyen
*Assistant Examiner* — Xanthia C Cunningham
(74) *Attorney, Agent, or Firm* — Kilpatrick Townsend & Stockton LLP (57) ABSTRACT

Various embodiments of the apparatus and/or methods are described for routing power to a wall-mounted appliance, particularly for routing electrical wiring and audio/video cabling up through a wall to power and communicate with a wall-mounted presentation device. The apparatus and systems include input and output enclosures with wiring therebetween and mechanisms for mounting the input and output enclosures adjacent to pre-cut wall openings. There exists at least one electrical input connector, disposed within the input enclosure, configured to electrically couple with a power source, and at least one electrical output connector, disposed within the output enclosure, configured to electrically couple with a wall-mounted appliance.

6 Claims, 8 Drawing Sheets

(56) References Cited

U.S. PATENT DOCUMENTS

| | | | |
|---|---|---|---|
| 5,617,680 A | 4/1997 | Beatty | |
| 5,886,673 A | 3/1999 | Thomas | |
| 5,947,752 A * | 9/1999 | Wu | 439/76.1 |
| 5,963,179 A | 10/1999 | Chavez | |
| 5,974,218 A | 10/1999 | Nagasaka et al. | |
| 6,180,878 B1 | 1/2001 | Gretz | |
| 6,262,691 B1 | 7/2001 | Austin et al. | |
| 6,273,377 B1 | 8/2001 | Archer | |
| 6,281,929 B1 | 8/2001 | Fimoff | |
| 6,293,035 B1 | 9/2001 | LaPointe | |
| 6,361,007 B1 | 3/2002 | Oby et al. | |
| 6,375,161 B2 | 4/2002 | Garceau | |
| 6,385,856 B1 | 5/2002 | Godin | |
| 6,396,459 B1 | 5/2002 | Pullman | |
| 6,404,405 B2 | 6/2002 | Wanat | |
| 6,427,348 B1 | 8/2002 | Webb | |
| 6,438,751 B1 | 8/2002 | Voyticky et al. | |
| 6,445,361 B2 | 9/2002 | Liu et al. | |
| 6,450,464 B1 | 9/2002 | Thomas | |
| 6,460,821 B1 | 10/2002 | Rhudy et al. | |
| 6,532,675 B2 | 3/2003 | Letourneau | |
| 6,727,861 B2 | 4/2004 | Antoine | |
| 6,731,250 B1 | 5/2004 | Berman | |
| 6,734,830 B1 | 5/2004 | Bickham | |
| 6,766,992 B1 | 7/2004 | Parker | |
| 6,768,474 B2 | 7/2004 | Hunt | |
| 6,777,611 B2 | 8/2004 | Ewald et al. | |
| 6,834,435 B2 | 12/2004 | Turner | |
| 6,873,304 B1 | 3/2005 | Malhotra | |
| 6,996,911 B1 | 2/2006 | Dinius | |
| 7,000,746 B2 * | 2/2006 | Mackin et al. | 191/12.4 |
| 7,027,006 B2 | 4/2006 | Holle | |
| D522,967 S * | 6/2006 | St. Clair | D13/139.7 |
| 7,057,575 B2 | 6/2006 | Malhotra | |
| 7,106,082 B2 | 9/2006 | Yoshioka | |
| 7,106,273 B1 | 9/2006 | Brunson et al. | |
| 7,122,738 B2 * | 10/2006 | Kanamaru | 174/50 |
| 7,220,129 B1 * | 5/2007 | Nishijima et al. | 439/34 |
| 7,253,785 B2 | 8/2007 | Holle | |
| 7,260,920 B2 | 8/2007 | Weir | |
| 7,435,901 B2 * | 10/2008 | Mori et al. | 174/53 |
| 7,456,802 B1 | 11/2008 | Bourgeois | |
| 7,460,081 B2 | 12/2008 | Holle | |
| 7,554,036 B1 | 6/2009 | DeCosta | |
| 7,555,842 B1 | 7/2009 | Asay | |
| 7,563,131 B2 * | 7/2009 | Sullivan et al. | 439/535 |
| 7,592,719 B2 | 9/2009 | Hoopes | |
| D603,342 S | 11/2009 | DeCosta | |
| 7,648,379 B2 * | 1/2010 | Johnson et al. | 439/215 |
| 7,651,353 B2 * | 1/2010 | Laukhuf | 439/215 |
| 7,683,853 B2 | 3/2010 | Michaelis | |
| 7,692,094 B1 | 4/2010 | DeCosta | |
| 7,741,562 B2 | 6/2010 | Crotinger et al. | |
| D632,545 S | 2/2011 | DeCosta | |
| 7,918,425 B2 | 4/2011 | Rathbone et al. | |
| 7,997,546 B1 | 8/2011 | Anderson et al. | |
| 8,011,628 B1 | 9/2011 | Suddeth | |
| 8,015,929 B2 | 9/2011 | Tyner | |
| D647,488 S | 10/2011 | DeCosta | |
| 8,061,051 B2 | 11/2011 | Allemand | |
| 8,081,139 B2 | 12/2011 | Schmidt et al. | |
| 8,336,221 B2 | 12/2012 | Steele et al. | |
| 8,339,329 B2 | 12/2012 | Shen | |
| 8,350,153 B1 | 1/2013 | DeCosta | |
| D678,840 S | 3/2013 | DeCosta | |
| D684,935 S | 6/2013 | DeCosta | |
| 8,462,075 B2 | 6/2013 | Lettkeman | |
| 8,646,186 B2 | 2/2014 | Lettkeman et al. | |
| 8,698,692 B2 | 4/2014 | Lettkeman | |
| 2002/0003504 A1 | 1/2002 | Yoshida et al. | |
| 2002/0067591 A1 * | 6/2002 | Tajima | 361/681 |
| 2002/0105476 A1 | 8/2002 | Overton | |
| 2002/0190172 A1 | 12/2002 | Oddsen, Jr. | |
| 2003/0086023 A1 | 5/2003 | Chung et al. | |
| 2003/0229900 A1 | 12/2003 | Reisman | |
| 2004/0149475 A1 * | 8/2004 | Gorin | 174/50 |
| 2004/0248462 A1 * | 12/2004 | Dyer et al. | 439/502 |
| 2005/0001781 A1 | 1/2005 | Antoine | |
| 2005/0007241 A1 | 1/2005 | Kline et al. | |
| 2005/0101183 A1 * | 5/2005 | McCoy et al. | 439/536 |
| 2005/0101336 A1 | 5/2005 | Otsuka | |
| 2005/0250375 A1 * | 11/2005 | Allison | 439/502 |
| 2006/0053447 A1 | 3/2006 | Krzyzanowski et al. | |
| 2006/0067066 A1 * | 3/2006 | Meier et al. | 361/785 |
| 2006/0248553 A1 | 11/2006 | Mikkelson et al. | |
| 2007/0192798 A1 | 8/2007 | Morgan | |
| 2008/0117091 A1 * | 5/2008 | Binder | 341/155 |
| 2008/0233794 A1 * | 9/2008 | Clark et al. | 439/502 |
| 2008/0271331 A1 | 11/2008 | Allemand | |
| 2009/0052122 A1 * | 2/2009 | Johnson et al. | 361/643 |
| 2009/0056970 A1 * | 3/2009 | Hoffman et al. | 174/66 |
| 2009/0124113 A1 * | 5/2009 | Sexton et al. | 439/369 |
| 2009/0150940 A1 | 6/2009 | St. John-Larkin | |
| 2009/0315804 A1 | 12/2009 | Schmidt et al. | |
| 2010/0031295 A1 | 2/2010 | Krzyzanowski et al. | |
| 2010/0046194 A1 | 2/2010 | Yang et al. | |
| 2010/0075540 A1 * | 3/2010 | Liao | 439/638 |
| 2010/0141379 A1 * | 6/2010 | Tucker et al. | 340/3.1 |
| 2010/0147580 A1 * | 6/2010 | Koesterich | 174/520 |
| 2010/0177010 A1 | 7/2010 | Michaelis | |
| 2010/0219183 A1 | 9/2010 | Azancot et al. | |
| 2011/0021066 A1 * | 1/2011 | Squires | 439/502 |
| 2011/0032175 A1 | 2/2011 | Kang | |
| 2011/0083399 A1 | 4/2011 | Lettkeman et al. | |
| 2011/0187624 A1 | 8/2011 | Lettkeman et al. | |
| 2011/0205142 A1 | 8/2011 | Lettkeman | |
| 2011/0259883 A1 | 10/2011 | DeCosta | |
| 2012/0137530 A1 | 6/2012 | Yun | |
| 2012/0151785 A1 | 6/2012 | Lettkeman et al. | |
| 2012/0162044 A1 | 6/2012 | Lettkeman et al. | |
| 2012/0256496 A1 | 10/2012 | DeCosta | |
| 2012/0256809 A1 | 10/2012 | Lettkeman | |
| 2012/0261529 A1 | 10/2012 | Lettkeman | |
| 2013/0056259 A1 | 3/2013 | Lettkeman | |
| 2013/0256480 A1 | 10/2013 | Lettkeman | |
| 2014/0090260 A1 | 4/2014 | Lettkeman et al. | |

OTHER PUBLICATIONS

Legrand, "Flat Screen TV Cord and Cable Power Kit—CMK70," 2011, 1 page.

Powerbridge, "3D Power Cable Total Solution Connector Kit Model #TSCK Power Extension Cable Management," 2 pages.

"PowerBridge In-Wall Power Extension System Home", accessed at http://www.poerbridgesolution.com on Sep. 7, 2011.

Author Unknown, "BMI Measuring Instruments," Accessed on Mar. 13, 2011, 9 pages.

Author Unknown, "Stanley Hand Tools, 77-009—IntelliPoint Plus Level," Accessed Mar. 13, 2011, 1 page.

Author Unknown, "Checkpoint U6 V-Groove Level," Chads Tool Box.com, Accessed Mar. 13, 2011, 6 pages.

Author Unknown, Treestand Manual, Locon Treestands, LLC, Waterford, Ohio, known to exist on Oct. 13, 2009, 2 pages. Accessed at: http://www.locontreestands . . . .

International Search Report and Written Opinion of PCT/US2010/052431, mailed Jun. 10, 2011, 7 pages.

Home Depot, "PowerBridge Ultra Low Profile In-Wall System", Oct. 18, 2013, 2 pages. Retrieved from: http://www.homedepot.com/catalog/pdfImages/ef/ef60a932-d90e-4a49-aa33-576da0d6feb6.pdf.

Sewell, "DataComm Flat Panel TV Cable Organizer Remodeling Kit with Power Outlet", Feb. 13, 2009, 1 page. Retrieved from: http://sewelldirect.com/Recessed-Cable-Plate-Remodeling-Kit-with-Electrical-Outlet.asp.

U.S. Appl. No. 13/085,210, filed Apr. 12, 2011 Non-Final Office Action mailed Mar. 27, 2013, 11 pages.

U.S. Appl. No. 13/084,632, filed Apr. 12, 2011, Non-Final Rejection mailed Jun. 3, 2013, 9 pages.

U.S. Appl. No. 12/483,016, filed Jun. 11, 2009, Notice of Allowance mailed Nov. 8, 2011, 8 pages.

International Search Report and Written Opinion of PCT/US2008/086423 mailed on May 11, 2008, 14 pages.

(56) References Cited

OTHER PUBLICATIONS

U.S. Appl. No. 13/085,210, filed Apr. 12, 2011 Final Office Action mailed Oct. 25, 2013, 12 pages.
U.S. Appl. No. 12/711,103, filed Feb. 23, 2010, Notice of Allowance mailed Feb. 12, 2013, 13 pages.
U.S. Appl. No. 12/711,103, filed Feb. 23, 2010, Non-Final Office Action mailed Aug. 1, 2012, 16 pages.
U.S. Appl. No. 13/893,304, filed May 13, 2013, Non-Final Office Action mailed Aug. 1, 2013, 10 pages.
U.S. Appl. No. 13/893,304, filed May 13, 2013, Notice of Allowance mailed Dec. 2, 2013, 23 pages.
U.S. Appl. No. 13/081,364, filed Apr. 6, 2011, Non-Final Office Action mailed Apr. 25, 2013, 12 pages.
U.S. Appl. No. 12/578,367, filed Oct. 13, 2009, Final Office Action mailed Nov. 19, 2012, 10 pages.
U.S. Appl. No. 12/578,367, filed Oct. 13, 2009, Non-Final Office Action mailed May 14, 2012, 12 pages.
U.S. Appl. No. 12/578,367, filed Oct. 13, 2009, Final Office Action mailed Jan. 31, 2012, 11 pages.
U.S. Appl. No. 12/578,367, filed Oct. 13, 2009, Non-Final Office Action mailed Sep. 20, 2011, 21 pages.
U.S. Appl. No. 12/970,749, filed Dec. 16, 2010, Non-Final Office Action mailed May 16, 2013, 13 pages.
U.S. Appl. No. 12/970,749, filed Dec. 16, 2010, Final Office Action mailed Feb. 6, 2013, 15 pages.
U.S. Appl. No. 12/970,749, filed Dec. 16, 2010, Non-Final Office Action mailed Sep. 14, 2012, 16 pages.
U.S. Appl. No. 12/970,749, filed Dec. 16, 2010, Notice of Allowance mailed Sep. 5, 2013, 9 pages.
U.S. Appl. No. 13/084,632, filed Apr. 12, 2011, Notice of Allowance mailed Nov. 18, 2013, 23 pages.
U.S. Appl. No. 12/979,597, filed Dec. 28, 2010, Non-Final Office Action mailed Mar. 28, 2014, 12 pages.
U.S. Appl. No. 12/328,082, filed Dec. 4, 2008, Notice of Allowance mailed Apr. 16, 2014, 24 pages.
U.S. Appl. No. 12/970,749, filed Dec. 16, 2010, Notice of Allowance mailed Apr. 16, 2014, 24 pages.
U.S. Appl. No. 13/084,632 filed Apr. 12, 2011, Notice of Allowance mailed Mar. 6, 2014, 15 pages.
U.S. Appl. No. 14/098,294 filed Dec. 5, 2013, Non Final Office Action mailed Mar. 13, 2014, 15 pages.

* cited by examiner

IN-WALL EXTENSION APPARATUS

BACKGROUND

Electrical outlets are typically positioned very near the floors in a home. However, it is becoming common for individuals to mount flat-screen and plasma televisions at eye level or several feet above the height of electrical outlets. Routing power and audio/video content to such wall-mounted devices typically requires running unsightly electrical and audio/video cords between the mounted devices and one or more electrical outlets or content sources, such as a set-top box or Blu-Ray™ player, below. Homeowners may be able to conceal dangling electrical cords and audio/video cables by strategically positioning furniture and/or wall hangings in the room, or they may opt to install an electrical outlet behind the television. However, making an electrical connection or modifying the electrical system in a home typically requires work and/or inspection by a licensed electrician, which can be costly and inconvenient. Many cost-conscious do-it-yourself homeowners may forgo hiring a licensed electrician and instead choose to drill holes in a wall and route an extension cord up inside the wall to the wall-mounted device, but this practice is dangerous and in violation of the National Electric Code™ (NEC™). Heat may cause an extension cord inside of a wall or an enclosed space to dry out over time. Lacking proper ventilation, an in-wall extension cord may crack, expose bare wires, create a point of electrical short, and spark. A system for safely and easily running electrical power and audio/video cables up the inside of a wall to a wall-mounted appliance is desirable.

BRIEF DESCRIPTION OF THE DRAWINGS

The same number represents the same element or same type of element in all drawings.

DETAILED DESCRIPTION

The various embodiments described herein generally provide apparatus, systems, and methods for running power from an existing electrical outlet up the inside of a wall to an enclosure mounted behind or near a wall-mounted television or audio/video rack. Alternative embodiments provide apparatus, systems and methods for transferring audio/video content from a content source near the floor of a room, up inside of a wall to an enclosure mounted behind or near a wall-mounted television. More particularly, the various embodiments described herein provide for the installation and use of a UL-listed, in-wall power extension apparatus that may be safely and legally installed and used without work or inspection by a licensed electrician.

The embodiments described herein comprise input and output enclosures and wiring therebetween. The output enclosure is to be mounted adjacent to a first wall opening located behind or near to a wall-mounted presentation device. The input enclosure is to be mounted adjacent to a second wall opening located on the same wall, somewhere below the presentation device and preferably near an outlet in the room. When installed, the wiring is to run inside the wall between the input and output enclosures. Power may then be routed from an already-existing electrical outlet in the room through the input enclosure, up through wiring in the wall and through the output enclosure to the presentation device. A variety of embodiments are configured to similarly transport audio/video content from a content source to the presentation device by utilizing at least one audio/video input connector, audio/video cabling, and at least one audio/video output connector.

Figure 1:
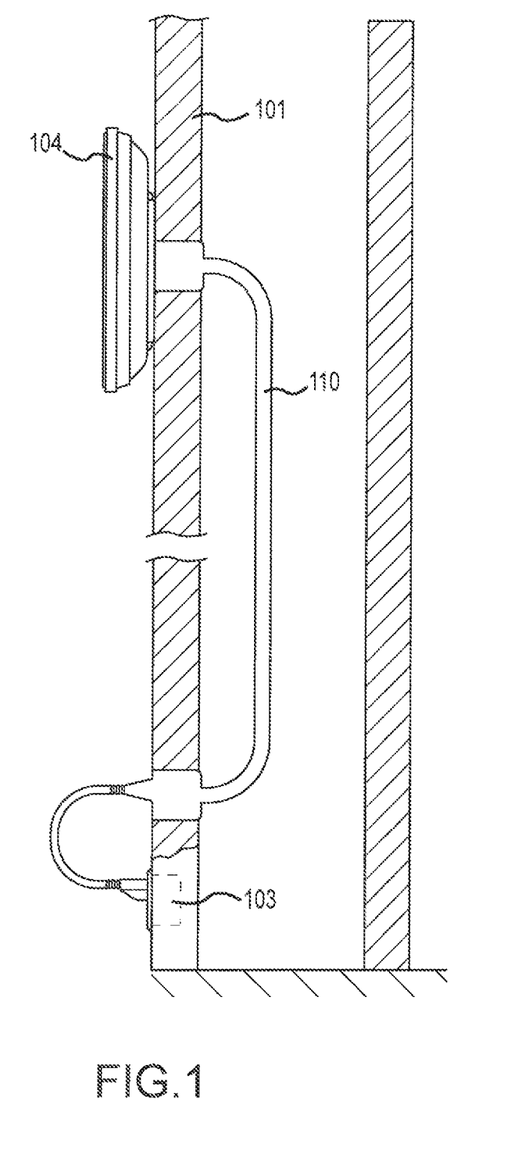
FIG. 1 illustrates a side-profile, in-wall view of an embodiment of an in-wall extension apparatus.

An in-wall view of an embodiment of an in-wall extension apparatus system is illustrated in FIG. 1. An appliance 104 mounts to wall 101. In at least one embodiment, the appliance 104 is a presentation device, such as a television or computer monitor, that is operable to display audio/video content. The appliance 104 may also comprise a plurality of electronics devices including, but not limited to, one or more wall-mounted speakers, a set-top box, a receiver, or an optical disk player such as a Blu-ray™ or DVD player. The appliance 104 is powered by power source 103, and power source 103 is electrically connected to the appliance 104 by in-wall extension apparatus 110.

Figure 2:
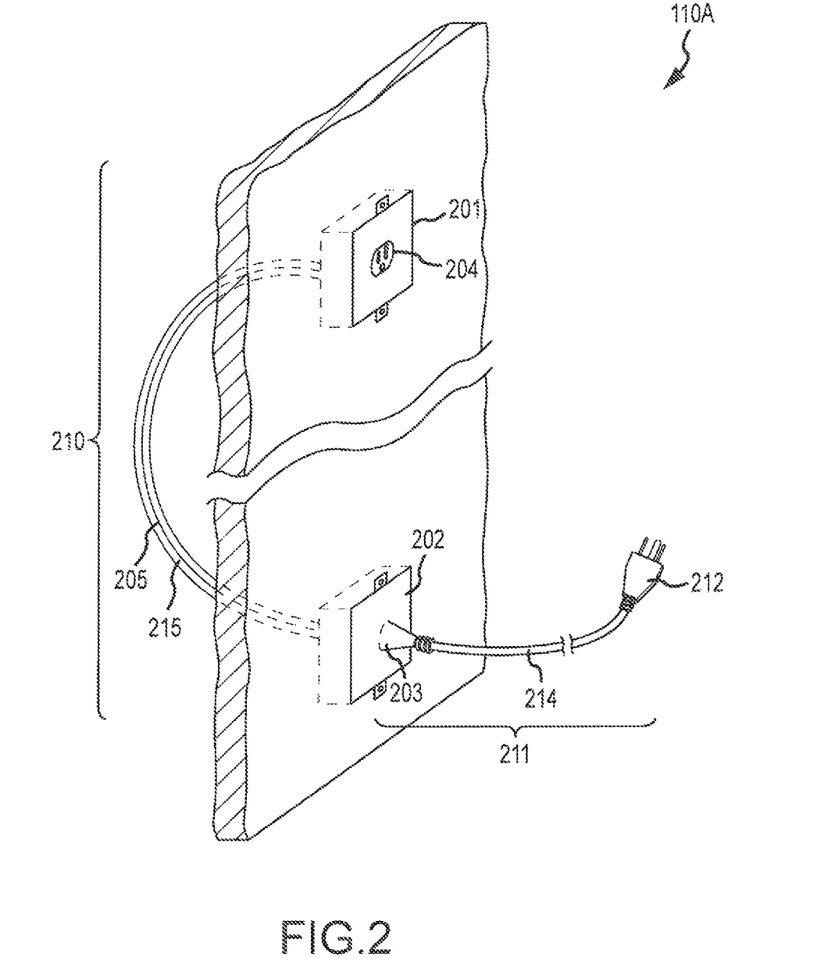
FIG. 2 illustrates an embodiment of the apparatus having a single electrical input and output.

FIG. 2 illustrates an embodiment of the extension apparatus 110 of FIG. 1 in greater detail. The extension apparatus 110A includes an output enclosure 201 and an input enclosure 202 and mechanisms for mounting (not shown in FIG. 2) the input and output enclosures adjacent to pre-cut wall openings (also not shown in FIG. 2). The input enclosure 202 includes at least one electrical input connector 203 configured to electrically couple with a power source 103, as shown in FIG. 1. The output enclosure 201 includes at least one electrical output connector 204 configured to electrically couple with an appliance 104, such as a presentation device (See FIG. 1). Electrical wiring 205 runs between the input and output enclosures 201 and 202, connecting the electrical input connector 203 to the electrical output connector 204, as shown in FIG. 2. The electrical wiring 205 may be encased in an insulating material 215 made from a material that is listed for in-wall use. In one embodiment, the insulating tube 215 may be constructed of PVC. In another embodiment, it may be a length of a metallic substance.

In at least one embodiment shown in FIG. 2, the extension apparatus 110A is a single-piece device with all openings sealed. In this embodiment, the apparatus 110A comprises a concealed, in-wall portion 210 that is non-detachably connected to an exposed, in-room portion 211. The in-wall portion 210 comprises input and output enclosures 201 and 202, one or more electrical input connectors 203, one or more electrical output connectors 204, and electrical wiring 205 therebetween. The exposed, in-room portion 211 comprises a length of electrical wiring 214 coupled to the electrical input connector 203 and also coupled to a male plug member 212, which can be plugged into an existing electrical outlet in the room to transfer power through the apparatus 110A to the appliance 104. The in-room portion 211 may resemble an extension cord, but in the single-piece embodiment depicted by FIG. 2, the length of electrical wiring 214 is non-detachably affixed to the input enclosure 202.

The entire in-wall portion 210 of the apparatus 110A may be hard-wired, molded, and sealed such that it is impenetrable to air, dust and/or moisture, and resistant to excessive heat. It may be encased or sealed with any type of fire and safety code compliant material, including, but not limited to, polyvinyl chloride (PVC), polyethylene, polypropylene, fluorinated ethylene propylene (Teflon EVP™), and other plastics and rubbers, as well as metallic substances, such as aluminum, steel or stainless steel. In at least one embodiment, all connections between the wiring, cabling, and various connectors may be internal to the apparatus and completely inaccessible to the user.

Figure 3:
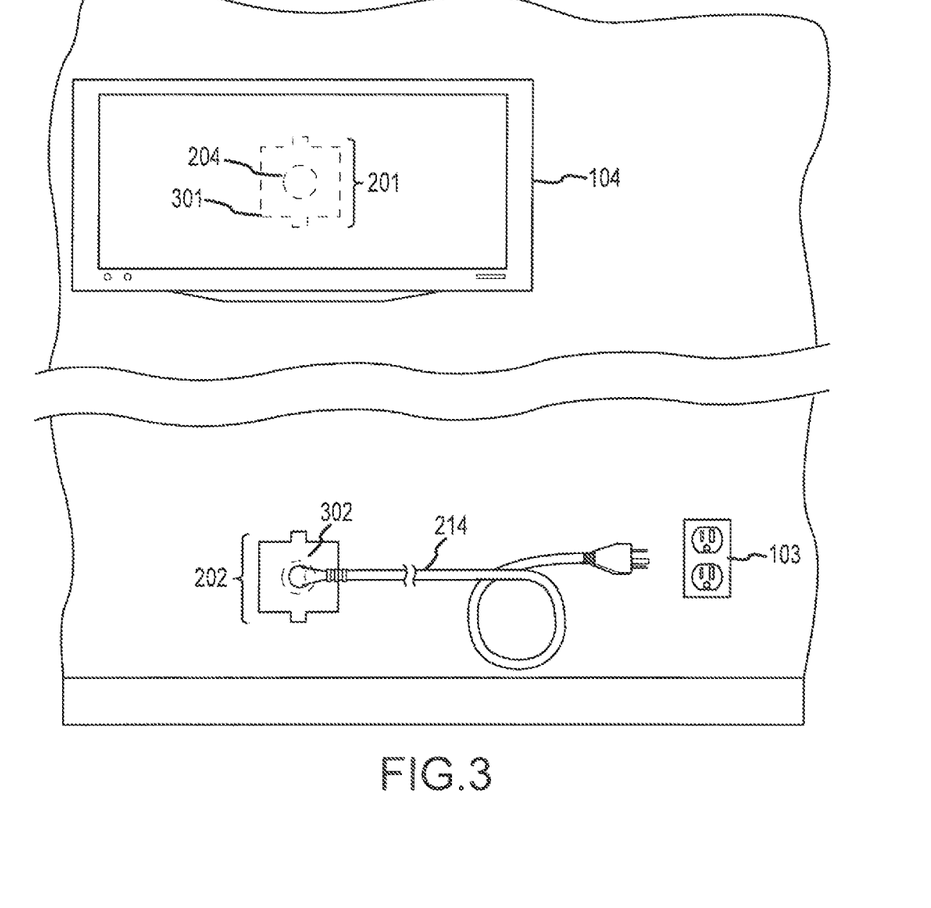
FIG. 3 illustrates an in-room perspective view of an embodiment of the apparatus and system components relative to one another when the apparatus is installed.

FIG. 3 illustrates an in-room perspective of the mounted system including upper and lower wall openings 301 and 302, the output enclosure 201, the input enclosure 202, an electrical outlet 103, and a presentation device 104. In FIG. 3, the broken-line showing of output enclosure 201, first opening 301, and second opening 302 indicates that these features are not actually visible to a user in this embodiment once the installation process is complete, as the output enclosure 201 and the upper wall opening 301 are covered by presentation device 104, and the lower opening 302 is covered by the input enclosure 202.

The presentation device 104 or other appliance (not pictured) will typically mount in front of or adjacent to the output enclosure 201, as shown in FIG. 3. Electrical outlet 103 may be a power device having any number of power receptacles, operating at any appropriate voltage. In the United States the electrical outlet may be a standard A/C 120 V power outlet having two power receptacles. In a different embodiment, it may also be a power surge protector.

The input enclosure 202 is configured to mount adjacent to a first wall opening 302, while the output enclosure 201 is configured to mount adjacent to a second wall opening 301 on a wall. In at least one embodiment, the first and second openings may be on the same wall. However, it is to be appreciated that they may also be on different walls. For instance, the first and second openings may exist on opposite sides of a corner of a room, on opposite sides of a wall in different rooms, and/or exist on different floors within a home.

The presentation device may mount in front of or adjacent to the output enclosure 201. It may be electrically coupled to the electrical output connector 204 (not pictured in FIG. 3) in the output enclosure 201. The electrical wiring 205 (also not pictured in FIG. 3) runs inside of the wall, between the input and output enclosures 201 and 202.

The enclosures 201 and 202 may be sized appropriately relative to the holes such that the enclosures, when mounted, will completely cover and conceal the wall openings 301 and 302. The enclosures may be made of junction boxes, electrical cut-in boxes, or substantially rigid molded materials having a variety of shapes and/or sizes, including but not limited to, square, rectangular, elliptical, and circular. The enclosures may be identical in shape and/or size, or they may be shaped and/or sized differently from one another. The enclosures may be made out of a variety of materials including, but not limited to, aluminum, steel, stainless steel, and other plastics, rubbers or metallic substances.

Figure 4:
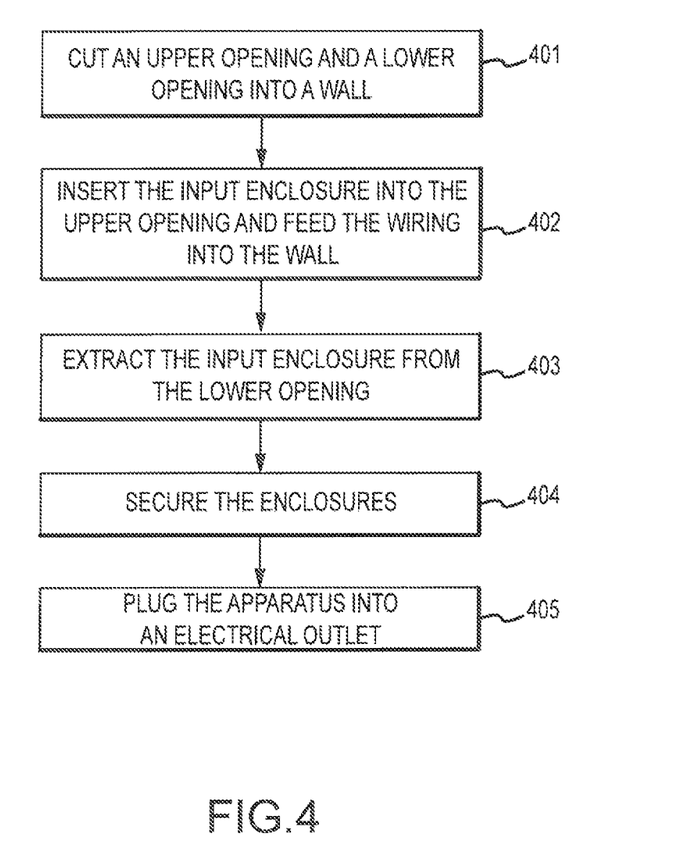
FIG. 4 illustrates a flow chart illustrating installation of the apparatus.

FIG. 4 is a flowchart providing a method of installation for the in-wall extension apparatus. The method will be described with reference to the extension apparatus of FIGS. 1-3. However, it is to be appreciated that the method depicted in FIG. 4 may not be the sole method of installation for the embodiments of FIGS. 1-3. Additionally, embodiments of the extension apparatus may exist for which the method of FIG. 4 is inappropriate. FIG. 4 may include other operations not illustrated for the sake of brevity.

In operation 401, two openings are cut into a wall. This operation may be performed by the homeowner, occupant, or other capable individual (the "Installer"). The first, upper hole may be cut on the wall where the presentation device 104 or other appliance is to be mounted. It may be positioned near to or behind the presentation device 104 or appliance, as shown by opening 301 in FIG. 3. This hole may be close enough to the presentation device 104 or other appliance such that the wires and/or cabling connecting to the presentation device or appliance may reach the power and audio/video receptacles in the output enclosure 201 when mounted adjacent to wall opening 301. In some embodiments, it may be desirable that the upper wall opening 301 be cut behind the wall-mounted presentation device 104, or as close to it as possible, in accordance with desired design criteria in order to conceal any wiring associated with the presentation device 104 or other appliance.

The second, lower wall opening 302 may be cut lower-down on the same wall, nearer to an electrical outlet. It at least one embodiment, the opening may be cut low enough that it may be more easily hidden from view by furniture in the room. In a different embodiment, the lower opening may be cut into a different wall than the upper opening. For example, the two openings may exist near to a corner of the room, on opposite sides of the corner.

The distance between the upper opening 301 and the lower opening 302 may be less than the total length of the cabling between the input and output enclosures. In at least one embodiment the Installer may cut the lower opening 302 within or very near to the same vertical plane as the upper opening 301 in order to provide easier installation.

In operation 402, the input enclosure 202 is inserted through the upper opening 301, and the electrical wiring 205 is fed into the wall. To perform this operation, the Installer may position the input enclosure 202 such that it may be inserted in through the upper wall opening 301 and, keeping a secure hold on the output enclosure 201, feed the input enclosure 202 and wiring 205 into the wall 101.

In operation 403, the input enclosure 202 is extracted from the lower opening 301. After enough cabling has been inserted into the wall, the Installer may fish out the input enclosure 202 through the lower opening 301. In one embodiment, the Installer may use a tool to assist in reaching the wiring 205 within the wall and extracting the input enclosure 202 from the lower opening 301.

In operation 404, the input and output enclosure 201 and 202 are secured adjacent to the wall. After threading the input enclosure 202 through the upper opening 301 and out of the lower opening 302, the input and output enclosures 201 and 202 may be mounted tightly into place within or adjacent to the upper and lower openings, 301 and 302, respectively.

In operation 405, the apparatus is powered by plugging the exposed, in-wall portion of the device into wall outlet 103.

The upper and lower openings 301 and 302 may be of a predetermined shape and size. They may be identical to one another, or unique from each other. To perform the method of FIG. 4, the upper opening 301 may be sized large enough for the input enclosure 202 to pass through it when oriented in one or more directions. The lower hole 202 may also be large enough for the input enclosure 202 to pass through it when oriented in one or more directions.

In one embodiment, the size and shape of the openings may be provided to the user in an instruction manual. In another, the Installer may be provided with one or more stencils that may be traced onto a wall, marking the boundaries along which the Installer may cut to make each respective hole. The upper and lower holes 301 and 302 may be sized and shaped such that the input and output enclosures 201 and 202 may be mounted in place adjacent to each respective hole. In at least one embodiment the output and input enclosures 201 and 202 may be mounted within the upper and lower openings 301 and 302, respectively.

Figure 5:
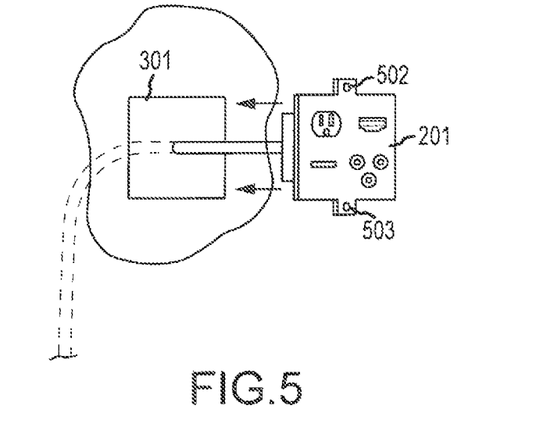
FIG. 5 illustrates the placement of the output enclosure relative to a wall opening in one embodiment of the system.
Figure 6:
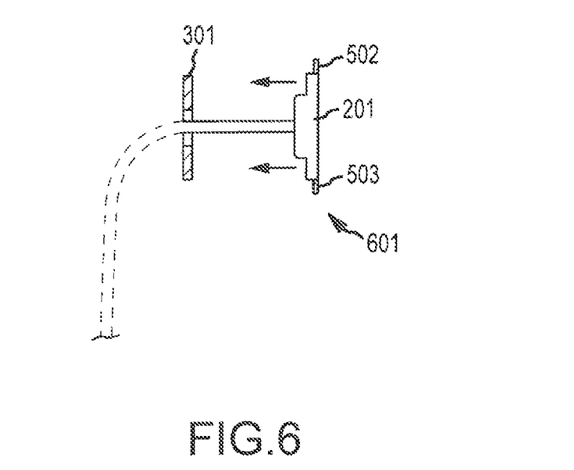
FIG. 6 illustrates a side profile of one of the output enclosures in one embodiment of the system.

FIG. 5 illustrates one possible embodiment for mounting an enclosure. Both FIGS. 5 and 6 depict the output enclosure 201, but it is to be appreciated that the input enclosure 202 may be mounted similarly. In at least one embodiment, the enclosure may be a box with a flange on one side with one or more holes for attaching the enclosure, adjacent to or within the wall, to the nearest stud. In another embodiment, the enclosure may have a flange on its face that may be threaded directly into the wall. Mounting members 502 and 503 may be threaded members, nails, drywall anchors, or other mounting members.

FIG. 6 illustrates a side-profile view of an enclosure as it is being threaded into place adjacent to opening 301. In at least one embodiment, the enclosure may have a mounting feature 601 such as a protruded lip, edge, or affixed cover plate that has one or more holes configured to secure to the enclosure to the wall via one or more mounting members. The protruded lip, edge, or affixed cover plate may effectively conceal the gap between the wall opening and the mounted enclosure. In both FIGS. 5 and 6, the arrows depict the distance and direction that the enclosure may be moved, relative to the illustrated position, to be properly mounted in place.

Figure 7:
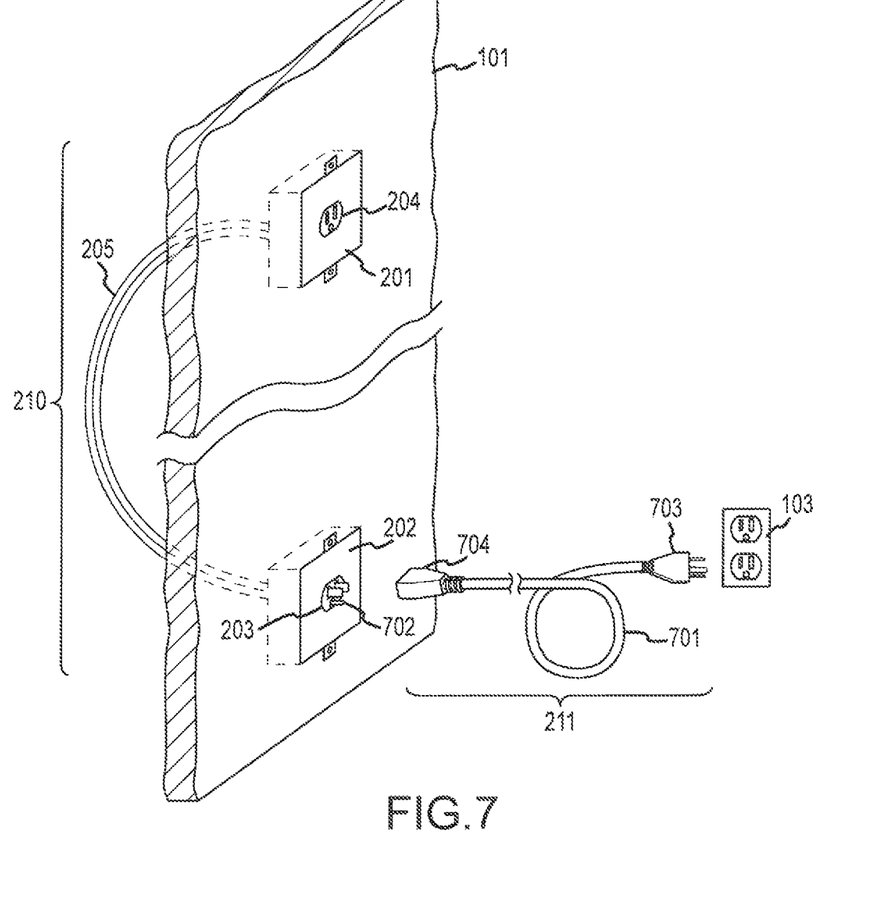
FIG. 7 illustrates a single-socket, dual-piece embodiment of the apparatus.

FIG. 7 depicts a dual-piece embodiment of the extension apparatus that comprises a concealed, in-wall portion 210 and an exposed, detachable in-room portion 211. The in-wall portion of the dual-piece embodiment differs from the one-piece embodiment (described above with reference to FIG. 2) in that the electrical input connector 203 comprises a male plug 702 that serves as a power inlet. In addition, the in-room portion of the apparatus 211 comprises a power cord 701 that may be detachably affixed to the male plug power inlet 702. To power the apparatus, the male plug end 703 of the power cord 701 may be plugged into an existing electrical outlet 103, and the female end 704 of the power cord 701 may be plugged into the male plug power-inlet 702, routing power from the electrical outlet 103, up through the wall 101 to the output enclosure 201.

The power cord 701 may be sized according to any appropriate gauge, depending on the desired criteria. In at least one embodiment it may be made of or encased in a different material than the concealed, in-wall portion of the apparatus. It is to be appreciated that the power cord 701 comprises the exposed in-room portion of the device and may therefore be exempt from certain electrical and building regulations that pertain to components used within the walls of a home.

In practice, the power cord may be purchased as part of a kit with the in-wall extension apparatus or be purchased separately. However, it is to be appreciated that the in-wall portion of the apparatus 210 may be hard-wired, sealed, and certified by a listing laboratory for in-wall use.

Figure 8:
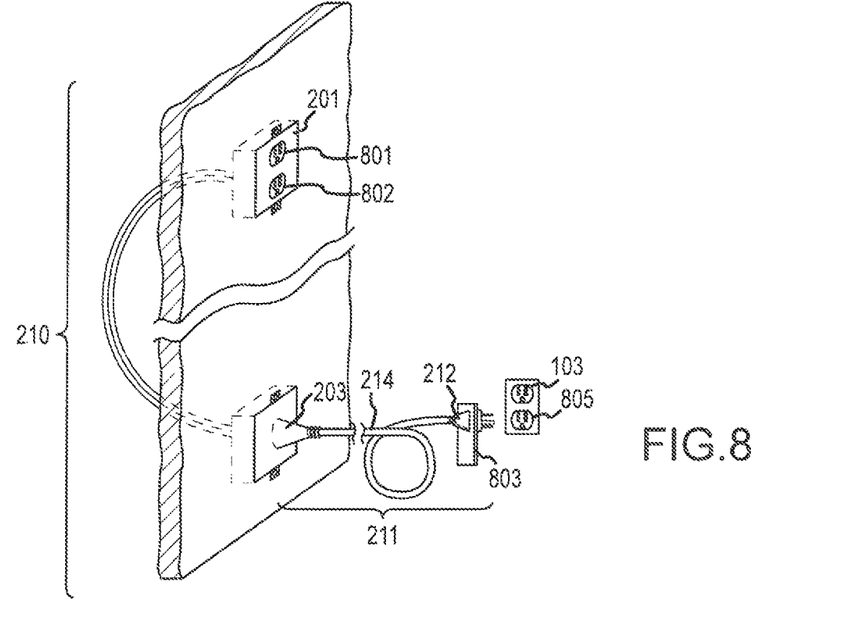
FIG. 8 illustrates a dual-socket, single-piece embodiment of the apparatus.
Figure 9:
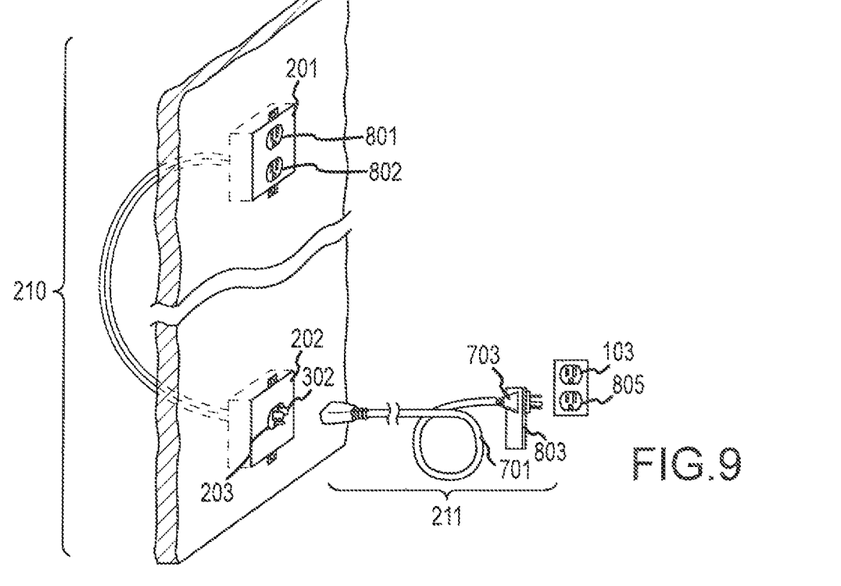
FIG. 9 illustrates a dual-socket, dual-piece embodiment of the apparatus.

In at least one embodiment, there exists two or more electrical output connectors disposed within the output enclosure 201, as shown in both FIGS. 8 and 9. These output electrical connectors may comprise female power receptacles 801 and 802, in parallel alignment with a single electrical input connector 203 within the input enclosure. In the embodiments of FIGS. 8 and 9, the exposed, in-room portion of the apparatus 211 may further comprise an electrical plate cover 803, which functions to prevent an electrical circuit in the home from overloading through electrical outlet 103 when two or more appliances are plugged into power receptacles 801 and 802 within the output enclosure 201. The electrical plate cover 803 will effectively block off one of the power receptacles in electrical outlet 103, prohibiting use of the unused receptacle 805 and protecting the system from overload.

FIG. 8 illustrates a one-piece embodiment of the apparatus having at least two power receptacles 801 and 802 in the output enclosure. In this embodiment, the electrical plate cover 803 is affixed to the male plug 212 end of the wire 214.

In contrast, FIG. 9 depicts a two-piece embodiment of the apparatus having at least two power receptacles 801 and 802 in the output enclosure. In this embodiment, the electrical plate cover 803 is affixed to the male plug end 703 of power cord 701.

The embodiments of FIGS. 8 and 9 permit the apparatus to power multiple wall-mounted appliances while mitigating the risk of power overload to the electrical system of the home. For example, the user may wish to power a wall mounted-television and also a device positioned on a wall-mounted audio/video rack, such as a set-top box, speaker, optical disk drive, or receiver. Both appliances may plug into power receptacles located on the output enclosure 201. The electrical plate cover prohibits the user from plugging additional appliances into the electrical outlet 103, protecting the circuit from overload.

Figure 10:
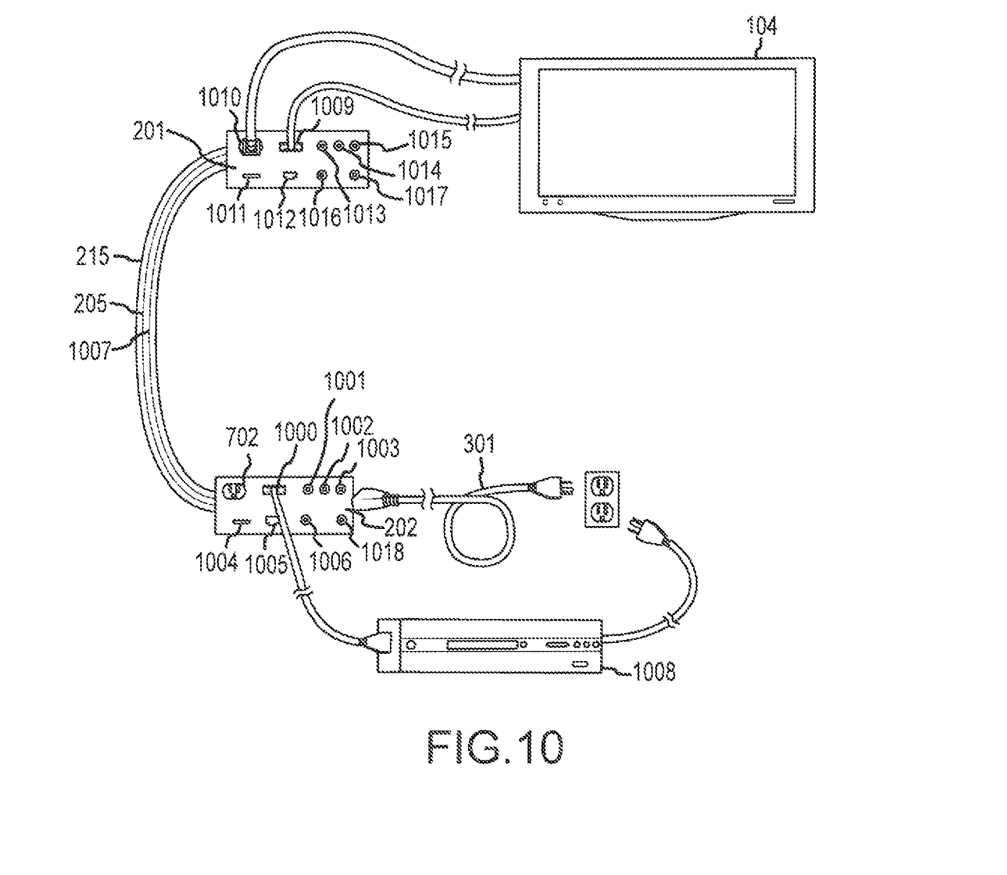
FIG. 10 illustrates an embodiment of the apparatus and system having an electrical input and multiple audio/video inputs and outputs.

FIG. 10 illustrates an embodiment of the apparatus that is configured to transfer audio/video content from a content source 1008 to a presentation device 104. One or more audio/video input connectors (1000-1006) may be disposed within the input enclosure 202, each configured to couple with a content source. Examples of content sources include, but are not limited to, set-top boxes, optical disk drives such as Blu-Ray™ or DVD players, receivers, and gaming consoles. Examples of audio/video connectors include, but are not limited to, F-connectors 1006, High-Definition Multimedia Interface (HDMI™) connectors 1000, Ethernet™ ports 1005, optical digital jacks, multi-channel analog audio ports, component video connectors, composite video connectors (1001, 1002, and 1003), audio ports (1017-1018), S-video connectors, VGA connectors, SVGA connectors, and USB ports.

Each audio/video connector (1000-1006, 1018) disposed within the input enclosure 202 is communicatively coupled to the first end of a corresponding audio/video transmission cable 1007. The audio/video transmission cables 1007 may be encased, with the electrical wiring 205, within the insulating material 215, and extend between the input enclosure 202 and the output enclosure 201. Examples of audio/video transmission cables may include, but are not limited to, coaxial cables, multi-channel analog audio cables, optical cables, HDMI™ cables, Ethernet™ cords, USB cords, component and composite video cables.

The second end of each audio/video transmission cable 1007 is communicatively coupled with a corresponding audio/video output connector (1009-1017) affixed within the output enclosure 201. Each audio/video output connector may be identical to its corresponding audio/video input connector. For example, HDMI™ input port 1000 may be coupled with an HDMI™ output port 1009. This configuration permits the user to bridge the HDMI™ connection between a Blu-Ray™ player 1008 and an HDTV by connecting an HDMI™ cable between a Blu-Ray™ player 1008 and an HDMI™ port 1000 in the input enclosure 202 and also connecting a second HDMI™ cable between an HDMI™ port 1009 in the output enclosure 201 and an HDMI™ port in the presentation device 104.

Similarly, RCA cables have, in most cases, a color-coded triad of plugs on each end. Some embodiments of the apparatus may therefore include red, yellow, and white female RCA connectors in the input enclosure 202, each coupled to an audio/video transmission cable 1007 that is also coupled, in the output enclosure 201, to a female RCA connector of the same color. In this embodiment, a first set of RCA cables is necessary to connect a DVD player 1008 to the RCA connectors (1001, 1002, and 1003) in the input enclosure and a second set of RCA cables is necessary to couple the RCA connectors in the output enclosure (1013, 1014, and 1015) with the presentation device 104.

It is not required that a pair of corresponding first and second audio/video connectors necessarily be identical. In at least one embodiment, there exists a conversion module within the apparatus. The conversion module may be included within the wiring 1007 or within either or both enclosures, 201 and 202. The conversion module may convert a first input video format to a second video format to be output on the presentation device 104. In such a case, a pair of corresponding first and second audio/video connectors may not be identical. For example, many computer monitors may be capable of outputting an audio/video stream in VGA format, while some televisions may require input in SVGA format. To accommodate this configuration, the input enclosure 201 may include a VGA connector communicatively coupled to a conversion module in the wiring 1007 that is communicatively coupled to an SVGA connector in the output enclosure 202.

In at least one embodiment there is only one pair of coupled audio/video connectors in the apparatus. For example, the output enclosure may have an electrical socket 1010 and an HDMI™ port 1009, while the input enclosure has only a power inlet 702 and a corresponding HDMI™ port 1000. In at least one embodiment, there will be several pairs of coupled audio/video connectors in the apparatus. For example, one embodiment may have ports for electrical, Ethernet™, HDMI™, and composite video plugs.

The length of audio/video cables 1007 and electrical wiring 205 between the input and output enclosures 201 and 202 may be approximately uniform for all such wires and cables within a single apparatus. However, the length of all such wires and cables, as a collective group, may vary in different embodiments, depending on the desired design criteria. For example, televisions mounted a few feet from the ground may utilize extension apparatuses with cabling two to four feet in length. In contrast, televisions mounted further up on a wall may utilize extension apparatuses with much longer cabling. It is to be appreciated that the length of cabling may equal or slightly exceed the distance between first and second wall openings 301 and 302.

In at least one embodiment the electrical wiring and audio/video cabling extending between input and output electrical and audio/video connectors is to be insulated according to standards set by the NEC as well as applicable regional building and electrical codes. Products sold in other jurisdictions may be insulated in accordance with regional standards and building codes. All electrical wiring and audio/video cabling may be bound together and may be threaded through a single insulating material 215 of a material and thickness that is compliant with applicable national and regional building and electrical standards for the given use.

Although specific embodiments were described herein, the scope of the invention is not limited to those specific embodiments. The scope of the invention is defined by the following claims and any equivalents therein.

What is claimed is:

1. An in-wall extension apparatus comprising:
   a first enclosure having a first predetermined shape configured to fit adjacent to a first wall opening and a first mounting mechanism configured to mount the first enclosure adjacent to the first wall opening;
   at least one audio/video input connector, disposed within the first enclosure, configured to communicatively couple with a content source;
   at least one electrical input connector, disposed within the first enclosure, configured to electrically couple to at least one power source;
   a second enclosure having a second predetermined shape configured to fit adjacent to a second wall opening and a second mounting mechanism configured to mount the second enclosure adjacent to the second wall opening;
   at least one audio/video input connector, disposed within the second enclosure, configured to communicatively couple with a presentation device;
   at least one electrical output connector, disposed within the second enclosure, configured to electrically couple with the presentation device;
   electrical-wiring electrically coupled to the electrical input connector at a first end and electrically coupled to the electrical output connector at a second end;
   audio/video wiring communicatively coupled to the audio/video input connector at a first end and communicatively coupled to the audio/video output connector at a second end; and
   wherein at least an in-wall portion of the apparatus is a single, hard-wired unit with all connections sealed, and the at least one electrical input connector is non-detachably coupled to a cord configured to plug into a wall.

2. The in-wall extension apparatus of claim 1, wherein the apparatus is insulated with polyvinyl chloride.

3. The extension apparatus of claim 1, wherein the at least one output electrical connector has a plurality of power receptacles, each coupled to the electrical wiring and in parallel arrangement with the at least one electrical input connector, and the cord is configured to couple to a first receptacle of a power source and further comprises a cover plate configured to cover a second power receptacle of the power source.

4. The in-wall extension apparatus of claim 1, wherein the at least one electrical input connector comprises at least one male plug, and the cord comprises an extension cord having a first end and a second end, the first end having a female socket configured to couple to the at least one male plug, the second end configured to plug into an electrical socket.

5. The in-wall extension apparatus of claim 1, wherein the at least one audio/video input and output connectors further comprise Ethernet ports.

6. The in-wall extension apparatus of claim 1, wherein the at least one input and output audio/video connectors further comprise F-connectors.

* * * * *